United States Patent [19]
Schenk et al.

[11] Patent Number: 5,323,331
[45] Date of Patent: Jun. 21, 1994

[54] METHOD AND CIRCUIT ARRANGEMENT FOR LEVEL MONITORING

[75] Inventors: Heinrich Schenk; Dirk Schnabel, both of Munich, Fed. Rep. of Germany

[73] Assignee: Siemens Aktiengesellschaft, Munich

[21] Appl. No.: 145,671

[22] Filed: Nov. 4, 1993

Related U.S. Application Data

[63] Continuation of Ser. No. 656,236, Feb. 15, 1991, abandoned.

[30] Foreign Application Priority Data

Mar. 6, 1990 [DE] Fed. Rep. of Germany ....... 4007013

[51] Int. Cl.$^5$ ................................ H03K 5/24
[52] U.S. Cl. ..................... 364/550; 364/514
[58] Field of Search ................. 364/550, 514; 375/10, 375/17; 341/122, 139, 132; 324/103 P; 307/351

[56] References Cited

U.S. PATENT DOCUMENTS

| | | | |
|---|---|---|---|
| 3,683,367 | 8/1972 | Monroe et al. | 341/139 |
| 3,858,199 | 12/1974 | Neuner et al. | 341/132 |
| 4,558,232 | 12/1985 | Simpson | 307/351 |
| 4,564,804 | 1/1986 | Wilke et al. | 307/351 |
| 4,851,842 | 7/1989 | Iwamatsu | 341/139 |
| 5,025,176 | 6/1991 | Takeno | 307/351 |

FOREIGN PATENT DOCUMENTS

| | | | |
|---|---|---|---|
| 0082575 | 6/1983 | European Pat. Off. | H04L 1/20 |
| 1189119 | 3/1965 | Fed. Rep. of Germany | |
| 1202313 | 10/1965 | Fed. Rep. of Germany | |
| 1208332 | 1/1966 | Fed. Rep. of Germany | |
| 1242261 | 6/1967 | Fed. Rep. of Germany | |
| 1227501 | 9/1968 | Fed. Rep. of Germany | |
| 1911678 | 10/1970 | Fed. Rep. of Germany | |
| 1292181 | 9/1974 | Fed. Rep. of Germany | H03K 5/18 |
| 3214574 | 10/1983 | Fed. Rep. of Germany | H04L 11/08 |
| 0067322 | 4/1982 | Japan | 341/132 |
| 2072908 | 10/1981 | United Kingdom | H04B 5/04 |

OTHER PUBLICATIONS

Harr; "Dual-Threshold Peak Detector Circuit"; vol. 20 No. 7 IBM Technical Disclosure Dec. 1977.
Morgan; "A/D Conversion Using Geometric Feedback AGC", IEE Transactions on Computers 1975.

*Primary Examiner*—Jack B. Harvey
*Assistant Examiner*—Ellis B. Ramirez

[57] ABSTRACT

In a method and circuit arrangement for level monitoring, a received or, respectively, absent data signal should be reliably recognized by the level monitoring equipment even given great fluctuations ($\geq 40$ dB). To this end, a reference value is first calculated and stored. The reference value is then compared to samples of the received signal. The comparison result is summed and it is used to effect the output of a control signal.

16 Claims, 2 Drawing Sheets

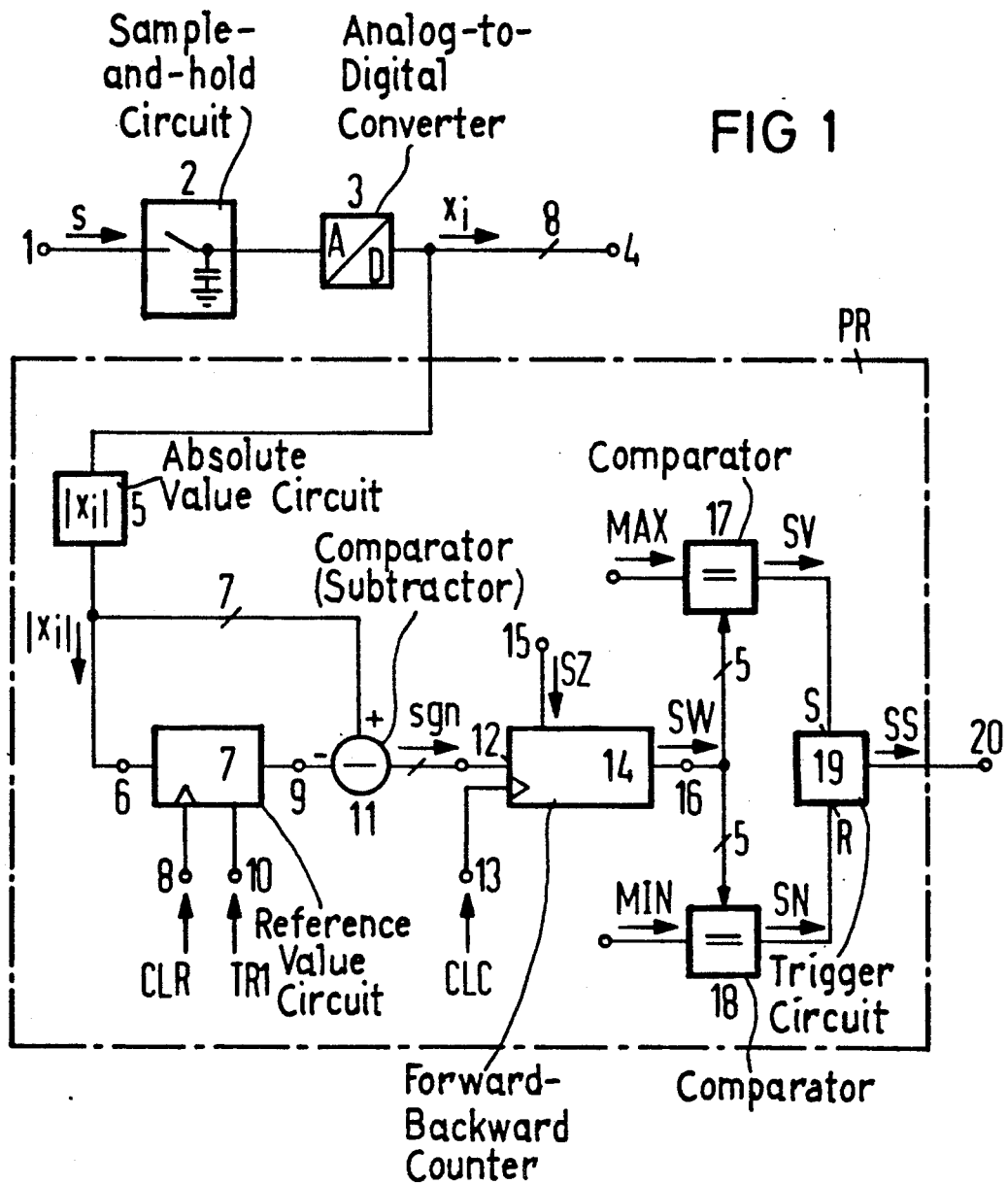

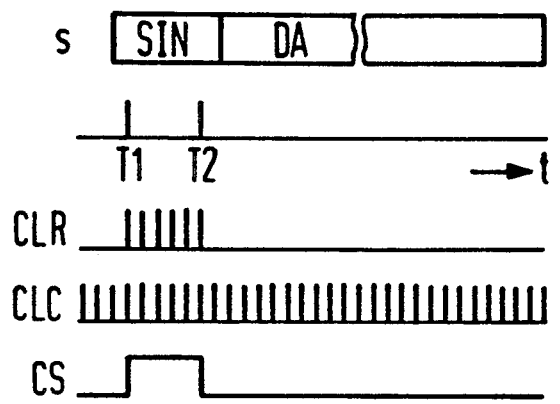
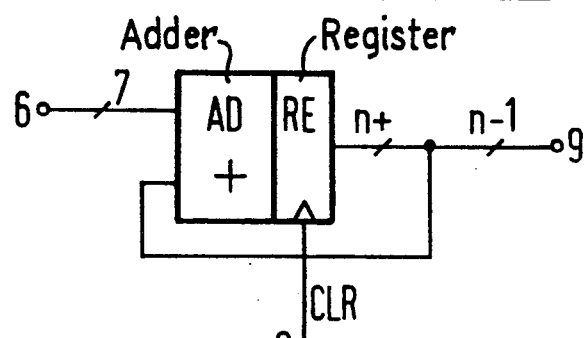
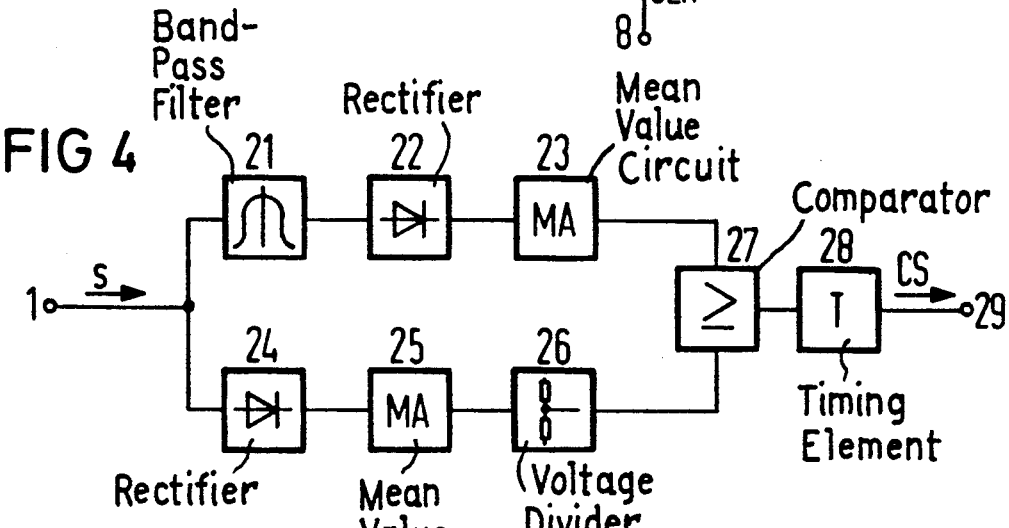
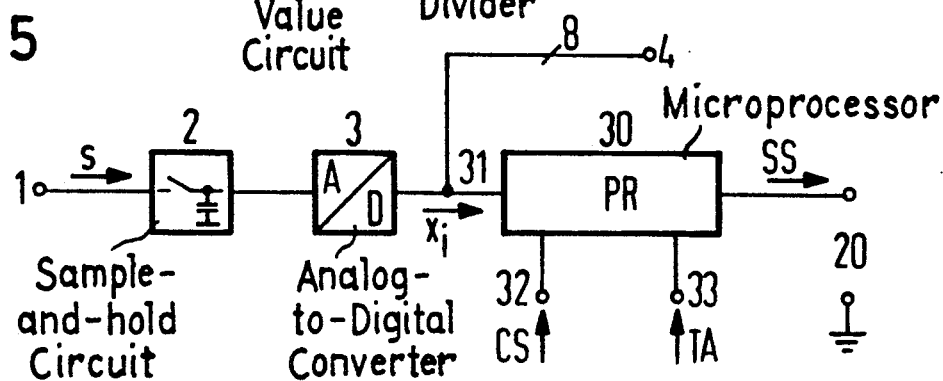

METHOD AND CIRCUIT ARRANGEMENT FOR LEVEL MONITORING

This is a continuation of application Ser. No. 07/656,236, filed Feb. 15, 1991 now abandoned.

BACKGROUND OF THE INVENTION

1. Field of the Invention

The present invention relates to a method and to circuit arrangements for level monitoring for a data signal.

2. Description of the Prior Art

It is frequently necessary to monitor the receiving level in digital data transmission. By so doing, one can determine whether a line is occupied by other subscribers or is free. A specific starting procedure in which only the subscriber side or the exchange side, respectively, transmit in succession is likewise frequently defined for a call setup. When switching, the level shut-off must first be monitored and recognized and the level cut in must be monitored and recognized later, for example, after the recognition of a prompter signal. The fault-free function must thereby be guaranteed for a great level range, since the level of the received signal is dependent on an extremely-different line length. Leveling monitoring disclosed up to now proceed on the basis of a fixed comparison value, as a result thereof a reliable operation is no longer possible given high-disturbed or noise-infested signals.

SUMMARY OF THE INVENTION

It is an object of the present invention to provide a method for leveling monitoring for a large level range.

Another object of the invention it to provide suitable arrangements for the realization of the method of the invention.

According to the present invention, the above objective method is achieved for leveling monitoring of a data signal which is characterized in that the received data signal is sampled and is converted into digital samples, in that a reference value proportional to the amplitude of the data signal is calculated and stored, in that the samples are compared in amount to the reference value and the differences or the operational signs of the differences of the comparisons are summed, and in that a control signal is output when a first comparison value is reached when the amplitudes of the samples more frequently upwardly than downwardly exceed the reference value, the control signal indicating the reception of a data signal, whereas an electrical control signal that indicates the absence of a data signal is output when a second comparison value is reached due to inverse amplitude relationships of the samples and the reference value.

The method has the advantage that a reference signal is first derived from the received signal. A received signal can be especially simply recognized when it is preceded by a special pre-signal. For example, the pre-signal can be a signal having a code employed or, respectively, on the modulation method selected, it is often advantageous to derive the reference value from the arithmetic or from the geometric mean.

It is particularly advantageous that the level recognition structure is equipped with a hysteresis. As a result thereof, a high reliability for the response of the level monitoring is guaranteed given a great level range.

An arrangement for the implementation of the method can be realized both with traditional circuits such as adders, subtractors, comparators and trigger circuits, as well as with a digital computer, for example a microprocessor.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a fundamental circuit diagram of a level monitoring device constructed in accordance with the present invention;

FIG. 2 is a graphic representation of a received data signal;

FIG. 3 is a basic circuit diagram of a device for calculating a reference value;

FIG. 4 is a fundamental circuit diagram of a signal recognition circuit; and

FIG. 5 is a schematic representation of a circuit arrangement realized with a microprocessor.

DESCRIPTION OF THE PREFERRED EMBODIMENTS

Referring to FIG. 1, a fundamental circuit diagram for level monitoring is illustrated as comprising a sample-and-hold circuit including an input 1 for receiving a band-limited data signal s. The sample-and-hold circuit 2 is followed by an analog-to-digital converter 3 including an output 4 for providing digital samples $x_i$. The output 4 is connected to a circuit 5 for forming an amount $\|x_i\|$ and whose output is connected, first of all, directly to a first input of the comparator 11 constructed as a subtractor, and via a reference value circuit 7 to the subtraction input of the subtractor 11. Only the sign bit sgn is supplied from the output of the subtractor 11 to a control input 12 of a forward-backward counter 14 which includes an output 16 connected to a pair of comparators 17, 18. The comparators each include an output which is connected to a set input S and a reset input R of a trigger circuit 19 which includes an output 20 for taking off a control signal SS.

The method of the present invention shall be set forth below with reference to the starting procedure according to the "American National Standard for Telecommunication"; however, it can be fundamentally employed in all transmission systems. A sign oscillation SIN of 10 kHz is transmitted at the beginning of a received data block according to FIG. 2 as a pre-signal, what is referred to as a prompter tone. The pre-signal or prompter tone is filtered out in a signal recognition circuit (FIG. 4) and the reference value circuit 7 is activated following the reliable recognition thereof beginning at a time T1 up to a time T2. The pre-signal or prompter signal, like the data DA that are received later as well, is sampled and digitized with, for example, a clock frequency of 80 kHz. Subsequently, the magnitudes $\|x_i\|$ of the digital sample $x_i$ are subsequently formed in the circuit 5 for forming absolute amounts. Dependent on the numerical representation, this can occur by omitting the sign bit or, given a two's complement representation of the negative samples, can occur by converting into a positive number. For example, the reference value circuit here is intended to form the arithmetic mean. This can be realized in a simple manner. According to FIG. 3, the reference value circuit is composed of an adder AD having a following register RE. The samples $|x_i|$ are supplied to a first input 6 of the adder AD and are added to the values stored in the register RE and that are supplied to a second input of the adder AD. The sum is stepped into the register with a working clock CLR that is supplied to a clock input 8 only between the times T1 and T2 and that corresponds to the sampling clock.

The arithmetic mean is formed in that the result stored in the register RE up to the time T2 is divided by the plurality of working clocks CLR. When this corresponds to a power of two, the division can be effected by a simple arithmetic shift, i.e. only the first n binary places of the n+k binary places present in the register are employed at the output 9. Given 256 sampling clocks, therefore, the k=8 least significant binary places are therefore ignored. The arithmetic mean multiplied by a norming factor, yields the reference value XR. When the norming factor, for example, is 0.5, then only the arithmetic mean is shifted by a further binary place. The reference value remains stored until the appearance of a further pre-signal or until the connection is cleared down.

When the quadratic mean (effective value) is to be employed for calculating the reference value, then the digital samples $x_i$ must be multiplied by one another, whereby a preceding information of amount, of course, can be omitted. Given the utilization of a maximum value for forming the reference value, only the sample that is greatest in terms of amount need be stored.

Whether the samples are greater than the reference value is determined in the comparator 11 (subtractor or comparator). When this is the case, then the forward-backward counter 14 counts forward with a working clock CLC applied at a clock input 13 and corresponding to the sampling clock, counting forward until a first comparison value SW equals MAX is reached. This will be the case during the pre-signal. The first comparator 17 of the pair of comparators then outputs a signal SV that sets a RS trigger circuit 19 and that outputs the control signal SS=1 at its output 20 which activates the receiving device and blocks its own transmission direction. The forward-backward counter must comprise an overflow logic, i.e. it dare not count beyond its extreme values, but must self inhibit. One extreme value can coincide with the comparison value MAX. Upon initialization or upon recognition of the pre-signal, the forward-backward counter can be set into an arbitrary position by a setting signal SZ at its input 15, as a result whereof, for example, the control signal SS=1 (level present) is output. The reference value can also be erased by a reset clock TR1 via a reset input 10 of the reference value circuit 7 during call set-up or call clear down.

After the end of the received data block, the samples $|x_i|$ will usually be smaller than the reference value XR. The forward-backward counter will now count backward as a result of the sign bit sgn until the second comparison value MIN is reached. The RS trigger circuit 19 is then reset by the second comparator 18 with a signal SN and a control signal SS=0 (no received signal) will be output for activation of its own transmission device. The level monitoring should generally react relatively quickly. For example, MIN=0 and MAX=31 can be selected as comparison values. The forward-backward counter 14 then comprises five trigger circuits. The comparators 17 and 18 can be integrated in the counter, for example, by a gate logic for the extreme values, whereby the carry outputs then directly control the RS trigger circuit 19 and block the working clock CLC.

Upon reception of the new data block, the counter will likewise again quickly reach its maximum value proceeding from its minimum value and will quickly signalize the renewed reception of a data signal. When, as in the exemplary embodiment of FIG. 1, only the criterion "greater than (or greater than or equal to) or lower than the reference value" are evaluated, it is irrelevant for the operation whether a standard comparator or a subtractor 11 is employed.

FIG. 4 illustrates an exemplary embodiment of a signal recognition circuit. This is not part of the present invention and is constructed differently in accordance with the different received signals. The received signal is forwarded to a first rectifier circuit 22 via a filter 21 which, for example, can be a band-pass filter or a resonant circuit, and is fed to a first input of a comparator 27 via a mean value circuit 23. Without special filtering, the received signal is also fed to a second input of the comparator 27 via a second rectifier 24, a second mean value circuit 25 and a voltage divider 26. A filter acting as a band-rejection filter can also be utilized in this circuit branch. A timing element 28 is introduced at the output of the comparator 27.

When the amplitude of the pre-signal exceeds a defined ratio relative to the amplitude of the overall signal, the timer element 28 is activated and supplies a time window signal CS (FIG. 2) between the time T1 and the time T2, the time window signal CS activating the reference value circuit, for example, by applying a reference clock CLR during the duration of the time window. When the time window should cover an exact plurality of working clocks, then a counter that is likewise controlled by the working clock CLC is employed as the timing element. The mean value circuits and the value divider can be realized in that the rectifiers charge or, respectively, discharge a capacitor via different ohmic resistors.

The signal recognition circuit, of course, can also be digitally executed. Therefore, a pre-signal having a constant frequency can be recognized by measuring the period duration. When a plurality of successive periods or a prescribed plurality of measured periods corresponds to the period duration of the pre-signal (prompter tone), then the time window signal is output for calculating the reference value.

The function of the processor PR, constructed as hardware structure in FIG. 1 can, apart from the analog-to-digital conversion of the data signal s, also be realized as a program portion in a digital processor. FIG. 5 illustrates the corresponding arrangement. A digital processor (microprocessor) 30 is supplied with the digital samples $x_i$ via its data input 31. In addition to a working clock TA that is supplied to its clock input 33, it also still requires the time window signal CS for controlling the formation of the reference value (when it does not itself form the reference value). The processor can, without problems, execute the mentioned jobs such as forming the absolute value, calculating the reference value from the arithmetic mean, forming the difference or, respectively, comparing the sample and reference values, as well as addition of the comparison result. Since the circuit expense is inconsiderable, the results of the formation of the difference, for example, can also be directly added and information concerning an existing received signal can thereby still be made even given extremely critical received signals, whereas the sole utilization of the operational sign corresponds to a rough quantization. A program-wise realization of the level monitoring confronts one of ordinary skill in the art with no difficulties whatsoever, since neither special mathematical, nor special program-related knowledge, is required.

One data output of the processor can be directly employed as the output 20 of the level monitoring arrangement. Of course, the control signal SS can also be output via a status memory.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method for level monitoring of a received data signal having a variable level, comprising the steps of:
   sampling and converting the received data signal into digital samples;
   calculating from said digital samples a reference value that is proportional to the level of the received data signal and storing said reference value;
   calculating differences between the reference value and magnitudes of each of the digital samples;
   calculating a sum of the differences;
   providing a maximum value and a minimum value; and
   comparing the sum to said maximum value and generating a control signal to indicate presence of the level of the received data signal when the sum is greater than said maximum value, and comparing the sum to said minimum value and generating said control signal to indicate absence of the level of the received data signal when the sum is below said minimum value.

2. The method of claim 1, wherein the step of calculating and storing a reference value comprises the step of calculating the reference value between first and second predetermined times during receipt of the data signal.

3. The method of claim 1, further comprising the steps of:
   receiving a prompter signal as a beginning portion of the data signal; and
   calculating and storing said reference value by calculating the reference value between the first and second predetermined times during the receipt of the prompter signal.

4. The method of claim 1 including the step of calculating and storing the reference value by calculating an arithmetic mean of the data signal multiplied by a constant weighting factor.

5. The method of claim 1 including the step of calculating and storing the reference value by calculating a quadratic mean of the data signal multiplied by a constant weighting factor.

6. The method of claim 1 including the step of calculating and storing the reference value by calculating a peak value of the data signal multiplied by a constant weighting factor.

7. A method for level monitoring of a received data signal having a variable level, comprising the steps of:
   sampling and converting the received data signal into digital samples;
   calculating from said digital samples a reference value that is proportional to the level of the received data signal and storing said reference value;
   calculating signs of differences between the reference value and magnitudes of each of the digital samples;
   calculating a sum of the signs of the differences;
   providing a maximum value and a minimum value; and
   comparing the sum to said maximum value and generating a control signal to indicate presence of the level of the received data signal when the sum is greater than said maximum value, and comparing the sum to said minimum value and generating said control signal to indicate absence of the level of the received data signal when the sum is below said minimum value.

8. The method of claim 7 wherein the step of calculating and storing a reference value comprises the step of calculating the reference value between first and second predetermined times during receipt of the data signal.

9. The method of claim 7, further comprising the steps of:
   receiving a prompter signal as a beginning portion of the data signal; and
   calculating and storing said reference value by calculating the reference value between the first and second predetermined times during the receipt of the prompter signal.

10. The method of claim 7 including the step of calculating and storing the reference value by calculating an arithmetic mean of the data signal multiplied by a constant weighting factor.

11. The method of claim 7 including the step of calculating and storing the reference value by calculating a quadratic mean of the data signal multiplied by a constant weighting factor.

12. The method of claim 7 including the step of calculating and storing the reference value by calculating a peak value of the data signal multiplied by a constant weighting factor.

13. An arrangement for level monitoring of a received data signal which has a variable level, comprising:
   sampling means for providing samples of the received data signal having said variable level;
   an analog-to-digital converter means connected to said sampling means for converting said samples into digital samples;
   a magnitude circuit means connected to said analog-to-digital converter means for providing magnitudes of said digital samples;
   a reference value calculating circuit means connected to said magnitude circuit means for providing from said digital samples a reference value that is proportional to the level of the received data signal;
   first comparator means connected to said magnitude circuit means and to said reference value calculating circuit means for providing signs by comparing the magnitudes of the digital samples to the reference value;
   clocked forward-backward counting means connected to said first comparator means for counting said signs;
   second and third comparator means connected to said counting means and including a maximum reference input and a minimum reference input for respectively receiving a maximum value and a minimum value; and trigger circuit means connected to said second and third comparator means for providing a control signal indicating, in response to a count reaching said maximum value, presence of the level of the received data signal, and to indicate, in response to another count reaching said minimum value, absence of the level of the received data signal.

14. The arrangement of claim 13 wherein said first comparator comprises a subtractor.

15. An arrangement for level monitoring of a received data signal having a variable level, comprising:

sampling means for providing samples of the received data signal having said variable level;

an analog-to-digital converter means connected to said sampling means for converting said samples into corresponding digital samples; and processor means connected to said analog-to-digital converter means and which is programmed for selectively calculating from said digital samples a reference value that is proportional to the level of the received data signal, for calculating differences between the reference value and magnitudes of the digital samples, for calculating a sum of the differences, for comparing the sum to a maximum value and to a minimum value, and for providing a control signal to indicate presence of the level of the received data signal when the sum is greater than the maximum value and to indicate absence of the level of the received data signal when the sum is below the minimum value.

16. An arrangement for level monitoring of a received data signal having a variable level, comprising:

sampling means for sampling the received data signal having said variable level;

an analog-to-digital converter means connected to said sampling means for converting said samples into corresponding digital samples; and processor means connected to said analog-to-digital converter means and which is programmed for selectively calculating from said digital samples a reference value that is proportional to the level of the received data signal, for calculating signs of differences between the reference value and magnitudes of the digital samples, for calculating a sum of the signs of the differences, for comparing the sum to a maximum value and to a minimum value, and for providing a control signal to indicate presence of the level of the received data signal when the sum is greater than the maximum value and to indicate absence of the level of the received data signal when the sum is below the minimum value.

* * * * *